March 31, 1959     G. F. GARDNER     2,880,402
SLIP RING TAPE
Filed Oct. 20, 1954
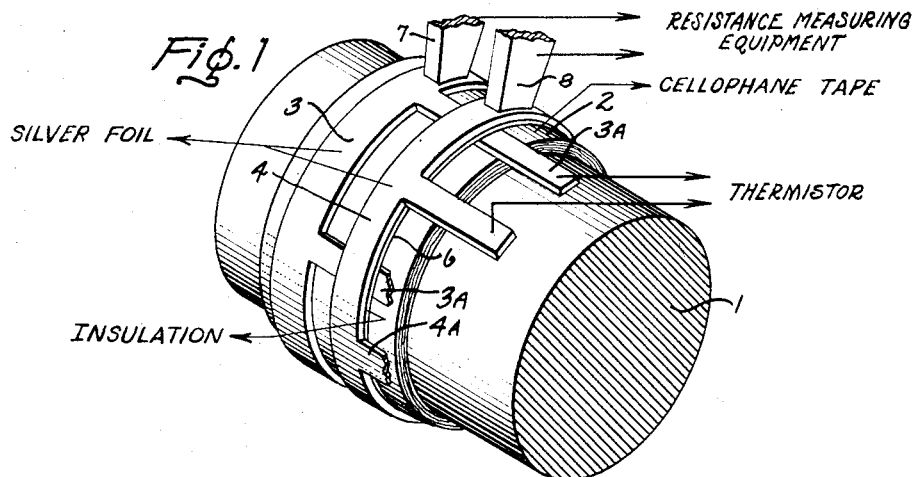
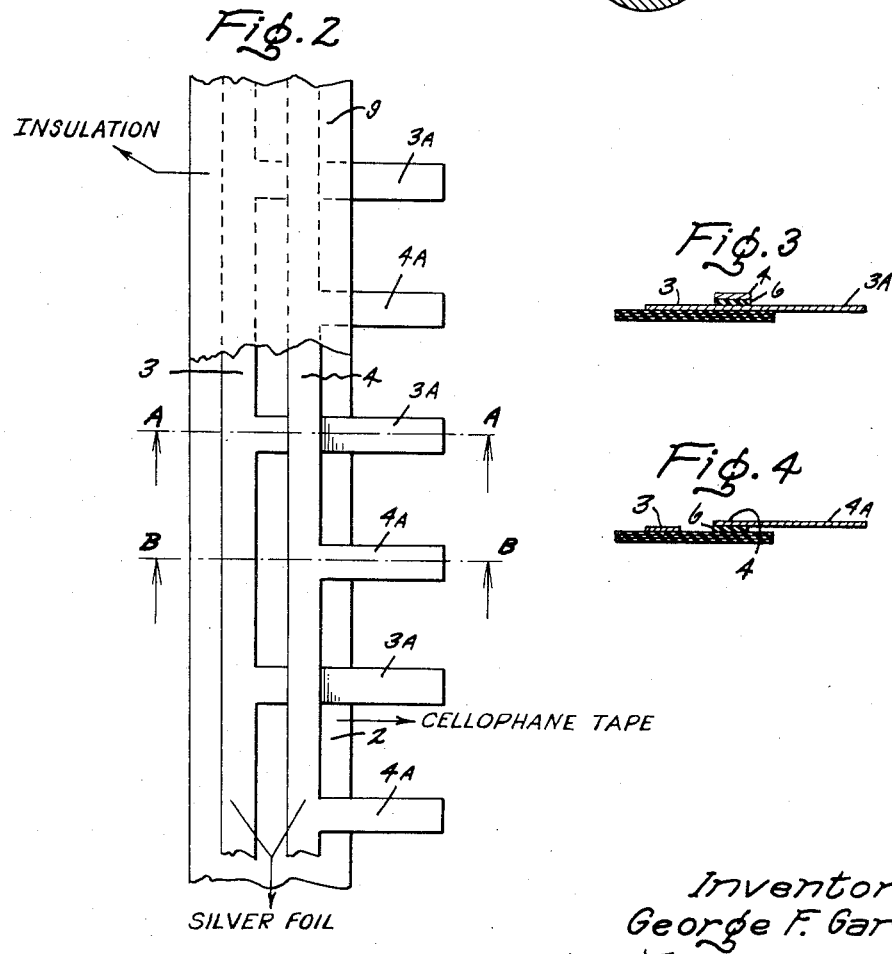
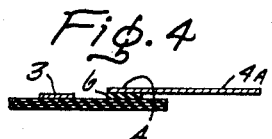
Inventor
George F. Gardner
by Merton D. Moore
His Attorney

United States Patent Office 2,880,402
Patented Mar. 31, 1959

2,880,402

SLIP RING TAPE

George F. Gardner, Scotia, N.Y., assignor to General Electric Company, a corporation of New York Application October 20, 1954, Serial No. 463,429

2 Claims. (Cl. 339—5)

This invention relates to a slip ring tape, and more particularly to such a tape as can be easily adapted for use in making temperature and other measurements in the field.

In field service and test work on rotating equipment such as motors, generators, etc., it is frequently desirable to measure the temperature of some member in rotary motion. For example, it is often desired to know the temperature of a rotating shaft within a bearing in order to determine whether or not the heat generated is excessive. Such a task is not easily accomplished in the field and is often inconvenient, expensive, and slow; and such tests are therefore often avoided. When such tests are presently made, thermocouples are connected to the shaft under test, and the leads from the thermocouples are connected to slip rings disposed around the shaft of the rotating member. Brushes are connected to the slip rings, and the signals from the thermocouples are then brought out to an indicator. The slip ring and brush assembly that is used for these tests is a carefully machined piece of equipment which must exactly fit the shaft of the rotating machine. Further, the materials for the brush assembly must be carefully chosen to avoid extraneous thermal voltages. Moreover, the contact resistances between the brushes and the slip rings are extremely critical since the output voltage from the thermocouple is extremely small and is not easily measured.

In order to overcome many of the foregoing objections, it has been proposed to substitute thermistors, or thermally sensitive resistors, for the thermocouples previously used. Thermistors are devices made of solids whose electrical resistance varies with temperature; however, an important distinction between thermistors and other variable resistance materials is their extreme sensitivity to relatively minute temperature changes. For further details about thermistors, reference is made to the Carboloy Thermistor Manual prepared by the Carboloy Department of the General Electric Company, Manual No. TH-13, effective March 22, 1954.

By using thermistors in conjunction with an improved slip ring assembly, all of the above-noted objections can be overcome, and it becomes possible to easily conduct temperature measurements upon rotating machines in the field. This invention is disclosed and claimed in the copending application of Clarence R. Droms and Herbert Robinson, Serial No. 463,428, filed on even date with this application, now abandoned, entitled "Measuring Method and Apparatus," and assigned to the General Electric Company, the assignee of the present invention.

It is now proposed to provide a tape having slip rings already attached thereto and which will eliminate the necessity for constructing a slip ring assembly in the field. This tape could be used to conduct temperature measurements, resistance measurements, or any other type of measurement upon rotating equipment in the field.

It is, therefore, one object of this invention to provide a slip ring tape for assisting in the rapid making of measurement tests on equipment in the field.

It is another object of this invention to provide a slip ring tape which can be adapted to provide a slip ring assembly for any size of rotating equipment.

Other objects and advantages will appear as the description of the invention proceeds.

In accordance with the invention, a roll of adhesive tape is provided, the tape being made of an electrically non-conductive material. Bonded to the non-adhesive side of the tape is a pair of electrically conductive strips insulated from one another and having portions projecting therefrom at periodic intervals for making electrical contact therewith, the two conductors being separated from one another so that a brush contact can ride on each conductor. An easily removed protective layer is placed over the conductors so that the tape can be rolled up without the sticky portions adhering to the conductors. By means of this tape, which can be easily carried into the field by test engineers, measurements on a rotating machine can be readily made. The slip ring tape is merely wrapped around the shaft of the rotating equipment being measured and cut to size. Then all of the projections but one on each conductor-slip ring are removed. If temperature tests are being conducted, leads from a thermistor that is disposed at the point where the temperature measurements are to be made are attached to the remaining projections. Brushes riding on the conductor-slip ring enable the thermistor resistance to be readily measured to determine the temperature at the point where the thermistor is placed.

The features of this invention which are believed to be novel and patentable are pointed out in the claims which form a part of this specification. For a better understanding of the invention, reference is made in the following description to the accompanying drawing, wherein like parts are indicated by like reference numerals, in which:

Fig. 1 is a perspective view of a slip ring tape made in accordance with the invention and wrapped around a rotating member as it would be in the field;

Fig. 2 is a top view of a portion of a slip ring tape roll made in accordance with the invention;

Fig. 3 is a cross sectional view taken along line A—A of Fig. 2; and

Fig. 4 is a cross sectional view taken along line B—B of Fig. 2.

Referring now to Fig. 1, there is shown a portion of a rotatable shaft 1 connected to a rotating machine which may have a thermistor placed at a point whose temperature it is desired to determine, if temperature measurements are being conducted. Wrapped around shaft 1 is a tape 2 which has a sticky underside. The upper surface of the tape 2 is provided with a pair of conductors 3 and 4 bonded thereto. Conductors 3 and 4 include projections 3A and 4A which form parts thereof. Conductor 4 is insulated from conductor 3 by an insulating layer 6 so that the former conductor will not make electrical contact with the projections of the latter conductor. Riding on top of conductors 3 and 4 are brushes 7 and 8, respectively. All of the projections except one on each conductor are shown as being torn off, the two remaining projections, as indicated in this figure, leading to a thermistor. The two brushes, as indicated in the figure, are connected to electrical resistance measuring equipment.

Referring now to Fig. 2, there is shown a top view of a slip ring tape of the invention. In this figure, conductors 3 and 4 are shown covered by an insulator 9 so that the tape can be made up in rolls without the sticky portion underneath touching the conductors. As will also be seen from this figure, the projections 3A and 4A make it possible to have an electrical contact for the thermistor at any point, since the remaining projections can then be torn off.

Referring now to Fig. 3, there is shown a cross-sectional view taken along line A—A of Fig. 2. From this view it will be seen that conductor 4 is insulated from conductor 3 by means of insulator 6 so that conductor 4 cannot touch projections 3A where it passes over these projections.

Fig. 4 is a cross sectional view taken along line B—B of Fig. 2 and showing the cross-section of the insulator 6 where it does not cross a projection.

Tape 2 may be of any flexible electrical insulator which will adhere to a rotating shaft. A suitable material would be cellulose tape, manufactured by the Minnesota Mining and Milling Company. Conductors 3 and 4 may be made of silver foil which is extremely thin and can be easily torn. The insulator 6 between strips 3 and 4 may also be made of cellulose tape, and the cover 9 of the strip may be made of any flexible substance such as paper. Conductors 3 and 4 may be bonded to the tape by any suitable bonding medium such as cement. By means of the slip ring tape of the invention, it is possible to fit a slip ring assembly to any size of rotating equipment and readily make measurements upon such equipment in the field.

It should be understood that the present invention is not limited to a slip ring tape made of the above materials, since other materials will readily occur to those skilled in the art. Further, a roll of slip ring tape having only one conductor thereon could be used instead of the two conductor roll depicted, and two or more of such pieces of tape could be used on a single shaft to provide two or more slip rings. Further, it should be understood that the present invention can be used in making many types of measurements upon rotating equipment, such as measuring resistance, and is not limited to temperature measurements alone.

While there has been described what is at present considered a preferred embodiment of the invention, it will be obvious to those skilled in the art that various changes and modifications may be made therein without departing from the invention; and it is aimed in the appended claims to cover all such changes and modifications as fall within the true spirit and scope of the invention.

What I claim as new and desire to secure by Letters Patent of the United States is:

1. An article of manufacture for providing slip rings to be mounted on rotating elements of various sizes, comprising a flexible electrical insulating tape one side of which is adhesive for securing to a rotating element, at least one electrically conductive foil strip affixed to and extending the length of the other side of said tape to provide a surface for sliding contact with a load element, said strip having a multiplicity of integral tearable portions projecting therefrom at periodic intervals along its length, one of said projecting portions adapted to be connected to a circuit component, and an electrically insulating cover means substantially coextensive with and covering said strip and the other side of said tape so that said tape can be rolled up and stored, said covering means being readily removable to expose said foil strip to sliding electrical contact when said tape is mounted on rotating elements to provide coupling between a load element in sliding contact with said strip and a circuit component connected to said one projecting portion, said strip and said tape being made of materials of such a thickness that they may be readily torn by hand to facilitate their use with rotating elements of various sizes.

2. An article of manufacture for providing slip rings to be mounted on rotating elements of various sizes, comprising a flexible electrical insulating tape one side of which is adhesive for securing to a rotating element, a pair of spaced apart electrically conductive foil strips affixed to and extending the length of the other side of said tape to provide a surface for sliding contact with load elements, each of said strips having a multiplicity of integral tearable portions projecting therefrom at periodic intervals along its length, one of said portions on each of said strips being adapted for connection to a circuit component, the projecting portions of the respective strips being staggered in space and projecting over the edge of said tape, and an electrically insulating covering means substantially coextensive with and covering said strip and the other side of said tape so that said tape can be rolled up and stored, said covering means being readily removable to expose said foil strips to sliding electrical contact when said tape is mounted on rotating elements to provide coupling between a load element in sliding contact with said strips and a circuit component connected to said one projecting portion, said strips and said tape being made of materials with a thickness such that they can be readily torn by hand to facilitate use with rotating elements of various sizes.

References Cited in the file of this patent

UNITED STATES PATENTS

| | | |
|---|---|---|
| 1,999,137 | Flewelling | Apr. 23, 1935 |
| 2,495,734 | Katzman | Jan. 31, 1940 |
| 2,498,493 | Hickernell | Feb. 21, 1950 |
| 2,749,382 | Lockard | June 5, 1956 |

FOREIGN PATENTS

| | | |
|---|---|---|
| 697,637 | Great Britain | Sept. 23, 1953 |